(12) United States Patent
Mitsuhashi

(10) Patent No.: US 9,481,278 B2
(45) Date of Patent: Nov. 1, 2016

(54) FRAME STRUCTURES FOR VEHICLE SEATS

(71) Applicant: TOYOTA BOSHOKU KABUSHIKI KAISHA, Aichi-ken (JP)

(72) Inventor: Atsutaka Mitsuhashi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 125 days.

(21) Appl. No.: 14/157,893

(22) Filed: Jan. 17, 2014

(65) Prior Publication Data
US 2014/0232161 A1 Aug. 21, 2014

(30) Foreign Application Priority Data

Feb. 18, 2013 (JP) ................................ 2013-028754

(51) Int. Cl.
| | |
|---|---|
| A47C 7/02 | (2006.01) |
| A47C 7/16 | (2006.01) |
| A47C 7/40 | (2006.01) |
| B60N 2/68 | (2006.01) |
| B60N 2/22 | (2006.01) |

(52) U.S. Cl.
CPC . B60N 2/68 (2013.01); B60N 2/22 (2013.01); B60N 2/682 (2013.01)

(58) Field of Classification Search
CPC ........................................................ B60N 2/68
USPC ........................................ 297/452.2, 452.18
See application file for complete search history.

(56) References Cited

U.S. PATENT DOCUMENTS

| | | | | |
|---|---|---|---|---|
| 1,908,821 | A | | 5/1933 | Cornell |
| 4,544,204 | A | * | 10/1985 | Schmale ................ B60N 2/682 |
| | | | | 297/452.18 |
| 5,564,785 | A | * | 10/1996 | Schultz et al. ............. 297/452.2 |
| 6,375,267 | B1 | | 4/2002 | Ishikawa |
| 8,523,284 | B2 | * | 9/2013 | Yamada et al. .......... 297/452.18 |
| 2009/0184561 | A1 | | 7/2009 | Wilson |
| 2012/0139315 | A1 | | 6/2012 | Yamada |
| 2013/0140868 | A1 | * | 6/2013 | Muck et al. ................ 297/452.2 |
| 2014/0021766 | A1 | * | 1/2014 | Watanabe .............. B21D 53/88 |
| | | | | 297/452.18 |

FOREIGN PATENT DOCUMENTS

| | | |
|---|---|---|
| CN | 102485532 | 6/2012 |
| DE | 102011003574 | 5/2012 |
| EP | 0989019 | 3/2000 |
| JP | 2001-149176 | 6/2001 |

(Continued)

OTHER PUBLICATIONS

U.S. Appl. No. 14/177,736 to Atsutaka Mitsuhashi, which was filed on Feb. 11, 2014.

(Continued)

*Primary Examiner* — Rodney B White
*Assistant Examiner* — Jody Giacoman
(74) *Attorney, Agent, or Firm* — Greenblum & Bernstein, P.L.C.

(57) ABSTRACT

Embodiments of the present invention may include a frame structure for a vehicle seat having two frames, a pile portion, and a section modulus reducing configuration. The two frames extend in a specific direction. At the pile portion, the two frames abut each other in a direction perpendicular to the specific direction and connected to each other. The section modulus reducing configuration is formed at an edge portion in the specific direction of the pile portion, and is configured to achieve a reduction in section modulus.

6 Claims, 9 Drawing Sheets

(56) References Cited

FOREIGN PATENT DOCUMENTS

| | | |
|---|---|---|
| JP | 2005067331 A * | 3/2005 |
| JP | 2010-149174 | 7/2010 |
| JP | 2011-42190 | 3/2011 |
| JP | 2011-230728 | 11/2011 |
| JP | 2012-131451 | 7/2012 |
| JP | 2012-158231 | 8/2012 |
| JP | 2012-218665 | 11/2012 |
| WO | 2012/161309 | 11/2012 |

OTHER PUBLICATIONS

Official Action for DE Pat. App. No. 102014200905.7 having an issuance date of Dec. 18, 2015.
Official Action, along with English-language translation thereof, for JP Appl. No. 2013-028754 dated May 31, 2016.
Chinese Office Action for CN App. No. 201410054294.6 mailed on Sep. 28, 2015, along with English-language translation thereof.

* cited by examiner

FRAME STRUCTURES FOR VEHICLE SEATS

This application claims priority to Japanese patent application serial number 2013-28754, the contents of which are incorporated herein by reference.

BACKGROUND OF THE INVENTION

1. Field of the Invention

Embodiments of the present invention relate to a frame structure for a vehicle seat. Preferably, the frame structure has two frames extending in a specific direction and integrally connected together.

2. Description of the Related Art

Japanese Laid-Open Patent Publication No. 2012-218665 discloses a frame structure for a vehicle seat. The frame structure has a side frame for a seatback. The side frame has a side frame main body formed of a thin steel plate and a sub frame formed of a thick steel plate, with the two frames being connected to each other in the height direction. The side frame main body and the sub frame are butt-welded to each other in the height direction. Another frame is passed astride the side frame main body and the sub frame. Since another frame is provided between the side frame main body and the sub frame, it is possible to suppress an abrupt change in the section modulus between them.

As a result, a reduction in structural strength is prevented, and the bonding strength for the side frame main body and the sub frame is enhanced. It should be noted, however, that end portions of frames differing in thickness are butt-welded to each other. Thus, it is rather difficult to perform positioning of the frame which makes the structure difficult to produce.

Therefore, there is a need in the art for a frame structure light in weight and providing high strength and easy to produce.

SUMMARY OF THE INVENTION

According to an aspect of the invention, a frame structure for a vehicle seat has two frames, a pile portion, and a section modulus reducing configuration. The two frames preferably extend in a specific direction. At the pile portion, the two frames abut each other in a direction perpendicular to the specific direction and are connected to each other. The section modulus reducing configuration is formed at an edge portion in the specific direction of the pile portion, and is configured to achieve a reduction in section modulus.

Thus, the change in section modulus caused between the pile portion and a region off the pile portion is small. The two frames abut each other in a direction perpendicular to the specific direction in which they extend, and are connected together. Thus, the frame structure is of a simple construction. In this construction, the reduction in structural strength accompanying an abrupt change in section modulus is suppressed. As a result, it is possible to achieve compatibility between the reduction in weight resulting from the reduction in section modulus and the securing of the requisite strength. Thus, it is possible to form a frame structure that can be easily produced.

According to another aspect of the invention, the two frames may have different mechanical strengths. The section modulus reducing configuration may be formed at an edge portion of the frame having a higher mechanical strength. Thus, it is possible to effectively reduce the section modulus of the edge region in the specific direction of the pile portion.

It is possible to more effectively reduce the change in section modulus generated between the pile portion and a region apart from the pile portion.

According to another aspect of the invention, the section modulus reducing configuration may be provided by a cutout portion formed at the edge portion of at least one of the frames. Thus, the section modulus reducing configuration can be formed simply and easily. The section modulus reducing configuration helps to achieve an overall reduction in the weight of the frame structure.

DETAILED DESCRIPTION OF THE INVENTION

Each of the additional features and teachings disclosed above and below may be utilized separately or in conjunction with other features and teachings to provide improved frame structures of vehicle seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
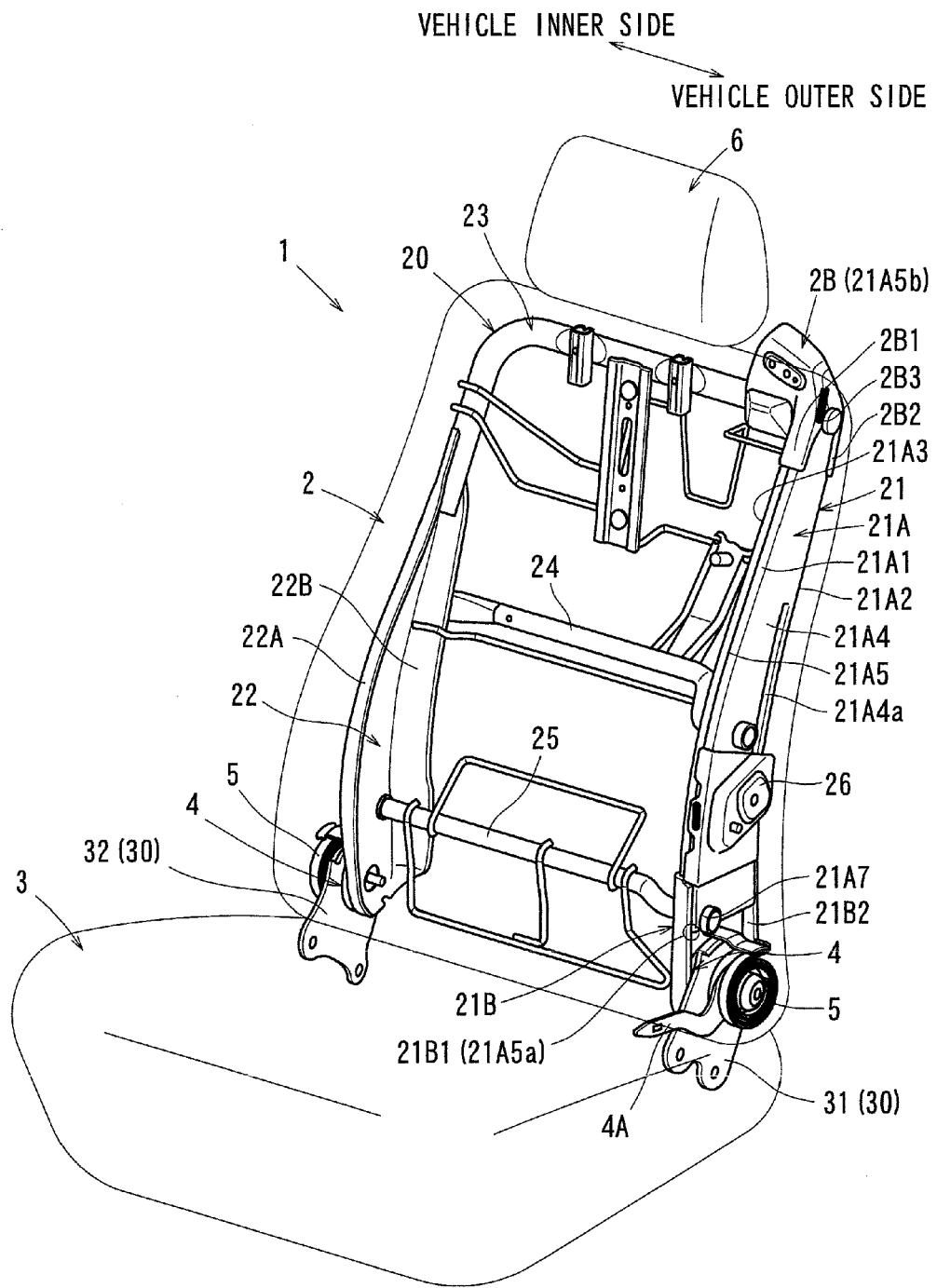
FIG. 1 is a perspective view of a frame structure of a vehicle seat.

An example of a frame structure for a vehicle seat will be described with reference to FIGS. 1 to 7. As shown in FIG. 1, the frame structure is applicable to a seat 1 of an automobile. The seat 1 has a seatback 2, a seat cushion 3 and a headrest 6. The seatback 2 is connected to the rear portion of the seat cushion 3. The seat cushion 3 is connected to a vehicle floor. The headrest 6 is attached to the top portion of the seatback 2.

As shown in FIG. 1, the lower end portions of the right and left sides of the seat back 2 are connected to the rear end portions of the right and rear sides of the seat cushion 3, respectively, via recliners 4. The recliners 4 connect the seatback 2 and the seat cushion 3 to each other such that they are able to rotate or lock in position. As a result, the seatback 2 may be freely tilted in the seat longitudinal direction with respect to the seat cushion 3, and can be locked at each of various positions. That is, it is possible to adjust the backrest angle of the seatback 2 with respect to the seat cushion 3.

As shown in FIG. 1, each recliner 4 is normally maintained in a state (locked state) in which the backrest angle of the seatback 2 is fixed. An operation lever 4A to be pulled up is provided at a vehicle-outer-side side portion (the right-hand side in FIG. 1) of the seat cushion 3. Through the operation of the operation lever 4A, the locked state of both recliners 4 is collectively released. As a result, the locked state is switched to a state in which the backrest angle of the seat back 2 can be freely adjusted. Spiral springs 5 are respectively hooked over the right and left sides of the seatback 2 and the seat cushion 3. When adjusting the backrest angle, the spiral springs 5 bias the seatback 2 forward to a position where it touches the back of a seated occupant. This biasing raises the seatback 2. At the time of adjustment of the backrest angle, the seatback 2 moves in conformity with the back of the seated occupant. As a result, the backrest angle can be adjusted simply and easily. The recliners 4 are basically of the same structure as those disclosed, for example, in Japanese Laid-Open Patent Publication No. 2011-116303.

The seat 1 is equipped with a three-point type seatbelt device (not shown) for constraining a body of the seated occupant. The seatbelt device has a retractor (not shown) and a belt guide 2B. The retractor is provided inside the seatback 2 and is configured to take up webbing. The belt guide 2B is provided at a shoulder portion on the vehicle outer side of the seatback 2. The webbing is pulled out of the retractor, and is extracted from the belt guide 2B to the front side of the seatback 2. A tip portion of the webbing is fastened to the vehicle-outer-side side portion of the seat cushion 3. A tongue plate, through which the webbing is passed, is provided halfway through the pulled out webbing. The occupant pulls the webbing by utilizing the tongue plate, and attaches the tongue plate to a buckle provided on the vehicle-inner-side (left-hand side in FIG. 1) portion of the seat cushion 3. As a result, the webbing crosses the chest and the waist of the occupant. The seatbelt device is of the same basic structure as that disclosed, for example, in Japanese Laid-Open Patent Publication 2011-131697.

When a front portion of the vehicle undergoes collision or the like, inertial force may cause the occupant to receive a strong impact throwing him towards the front side of the seat. In the construction in which the seatbelt device is provided on the seatback 2, a strong tensile force toward the seat front side is applied to the webbing supporting the occupant. The shoulder portion at the vehicle-outer-side of the seatback 2 (the belt guide 2B) constituting an extraction port of the webbing can be pulled. As a result, the seatback 2 receives a strong tensile force. The force will strive to push and bend the seatback 2 toward the seat front side around connecting points supported by the recliners 4. In order that the side frame 21 may not easily undergo bending deformation, the frame structure is endowed with the following high structural strength construction.

Figure 4:
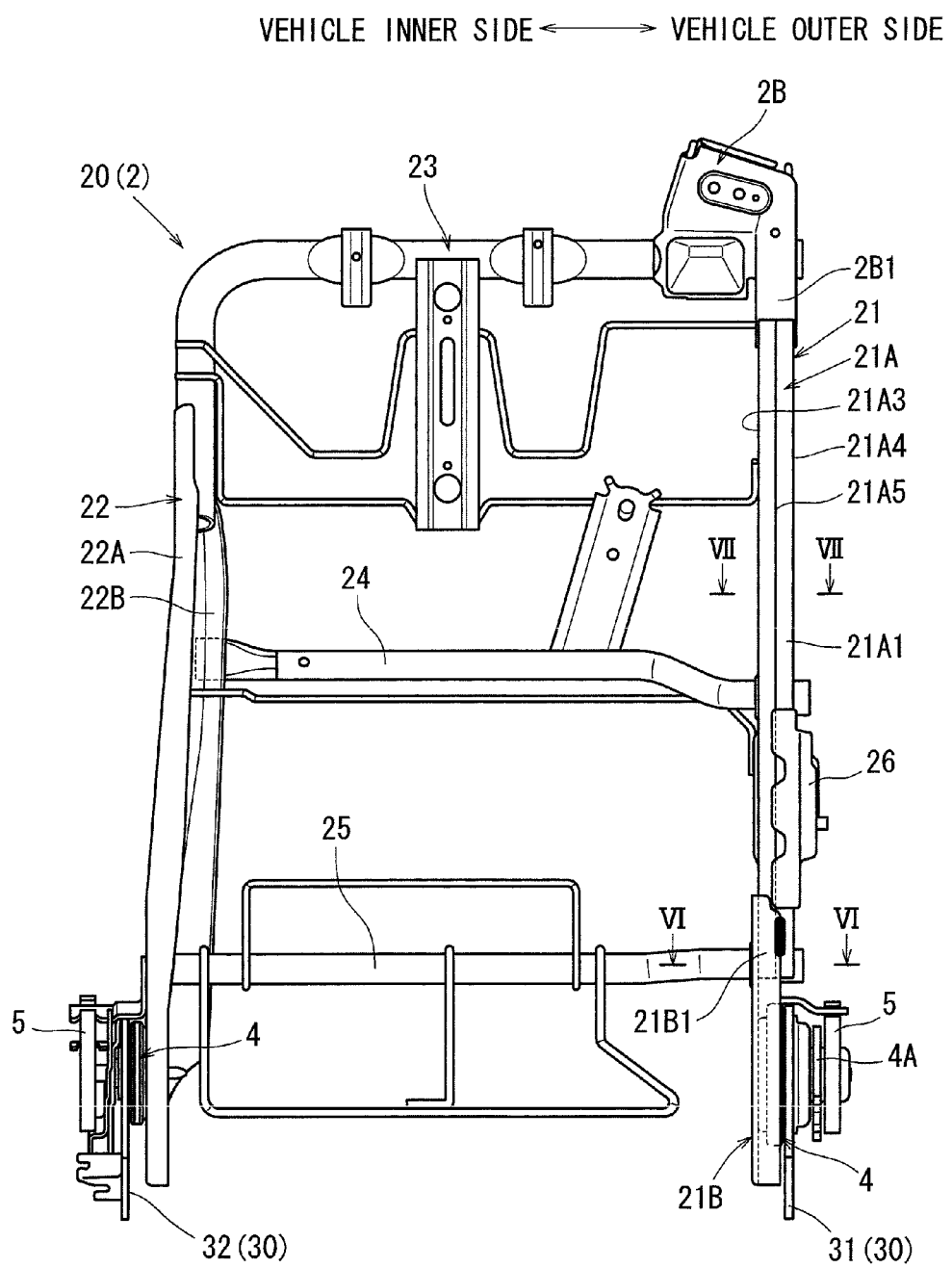
FIG. 4 is a front view of the frame structure of the vehicle seat.
Figure 5:
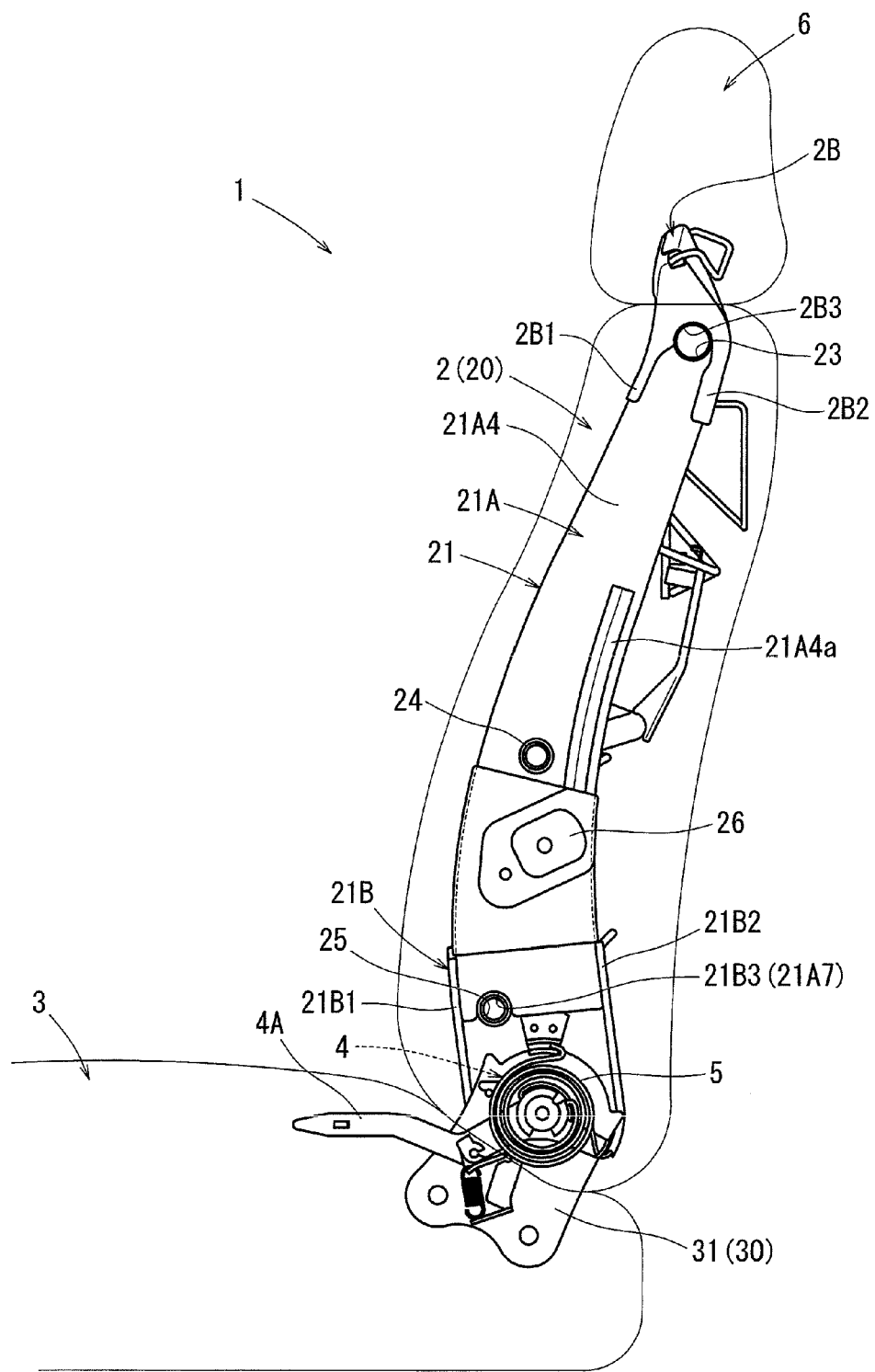
FIG. 5 is a side view of the frame structure of the vehicle seat.
Figure 6:
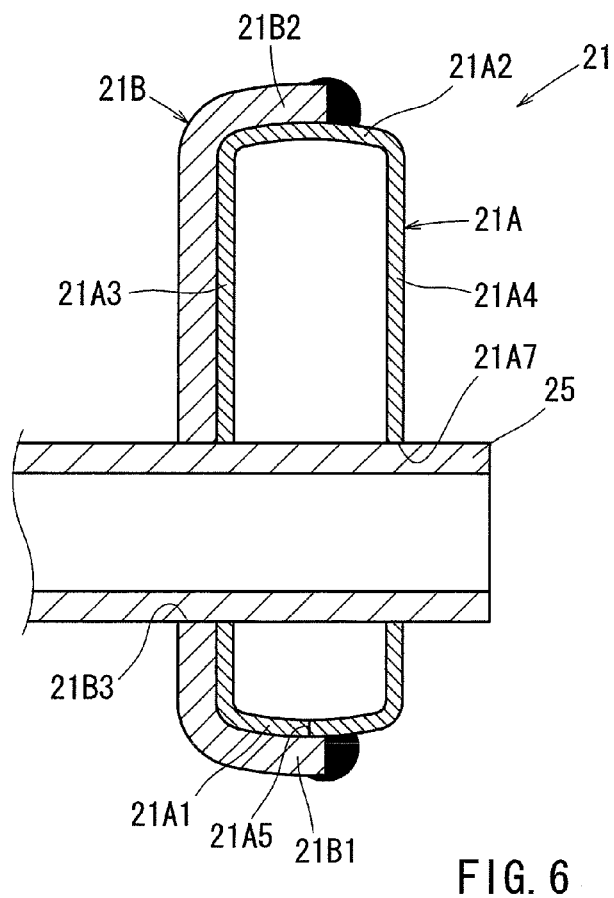
FIG. 6 is a cross-sectional view taken along line VI-VI in FIG. 4.

As shown in FIGS. 1 and 4, the seatback 2 has a reverse U-shaped back frame 20. The back frame 20 has side frames 21 and 22, and an upper pipe 23. The side frames 21 and 22 are formed as vertically elongated plates, and constitute the frameworks of the right and left side portions of the seatback 2. The upper pipe 23 bridges the upper end portions of the side frames 21 and 22. The upper pipe 23 is horizontally elongated, and constitutes the framework of the upper side portion of the seatback 2. The side frames 21 and 22 are vertically elongated. The side frames 21 and 22 are formed by cutting a steel plate material.

As shown in FIGS. 1 and 4, the upper pipe 23 is a round steel tube. The vehicle-inner-side end portion of the upper pipe 23 is formed through downward bending of the steel tube. A portion shaped into a semi-circular configuration is formed at the upper end portion of the side frame 22. The vehicle-inner-side end portion of the upper pipe 23 is butt-welded to the inner peripheral surface of that portion. As a result, the upper pipe 23 is connected to the side frame 22 firmly and integrally. The vehicle-outer-side end portion of the upper pipe 23 extends straight in the width direction of the seat. A semicircular hole 21A6 is formed at the upper end portion of the side frame 21. The vehicle-outer-side end portion of the upper pipe 23 is butt-welded to the inner peripheral surface (upper surface) of the semicircular hole 21A6. The belt guide 2B is welded to the vehicle-outer-side end portion of the upper pipe 23, and the belt guide 2B is welded to the side frame 21. Thus, the upper pipe 23 is connected to the side frame 21 firmly and integrally.

Figure 2:
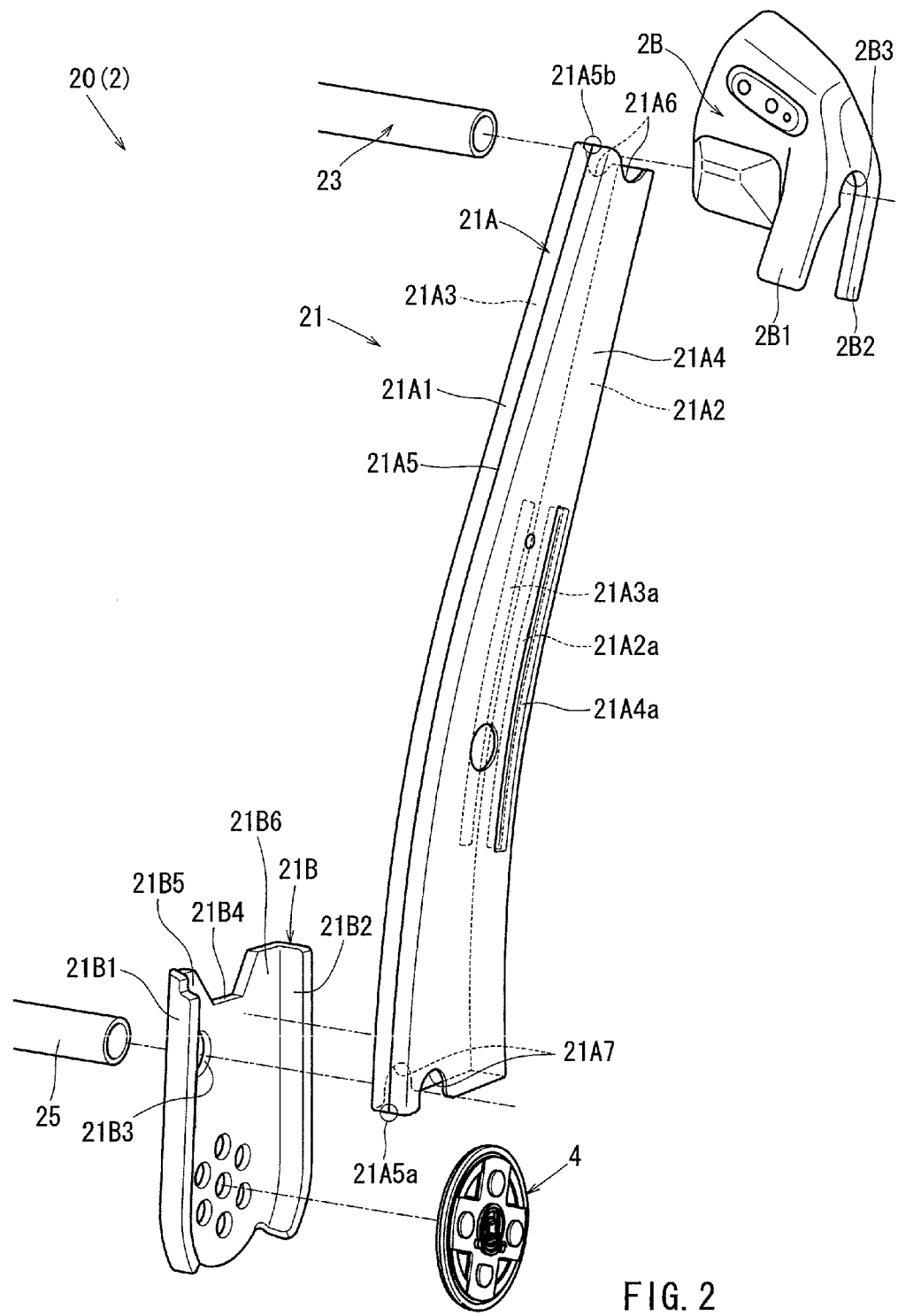
FIG. 2 is an exploded view of a vehicle-outer-side side-frame structure of a seat back.
Figure 3:
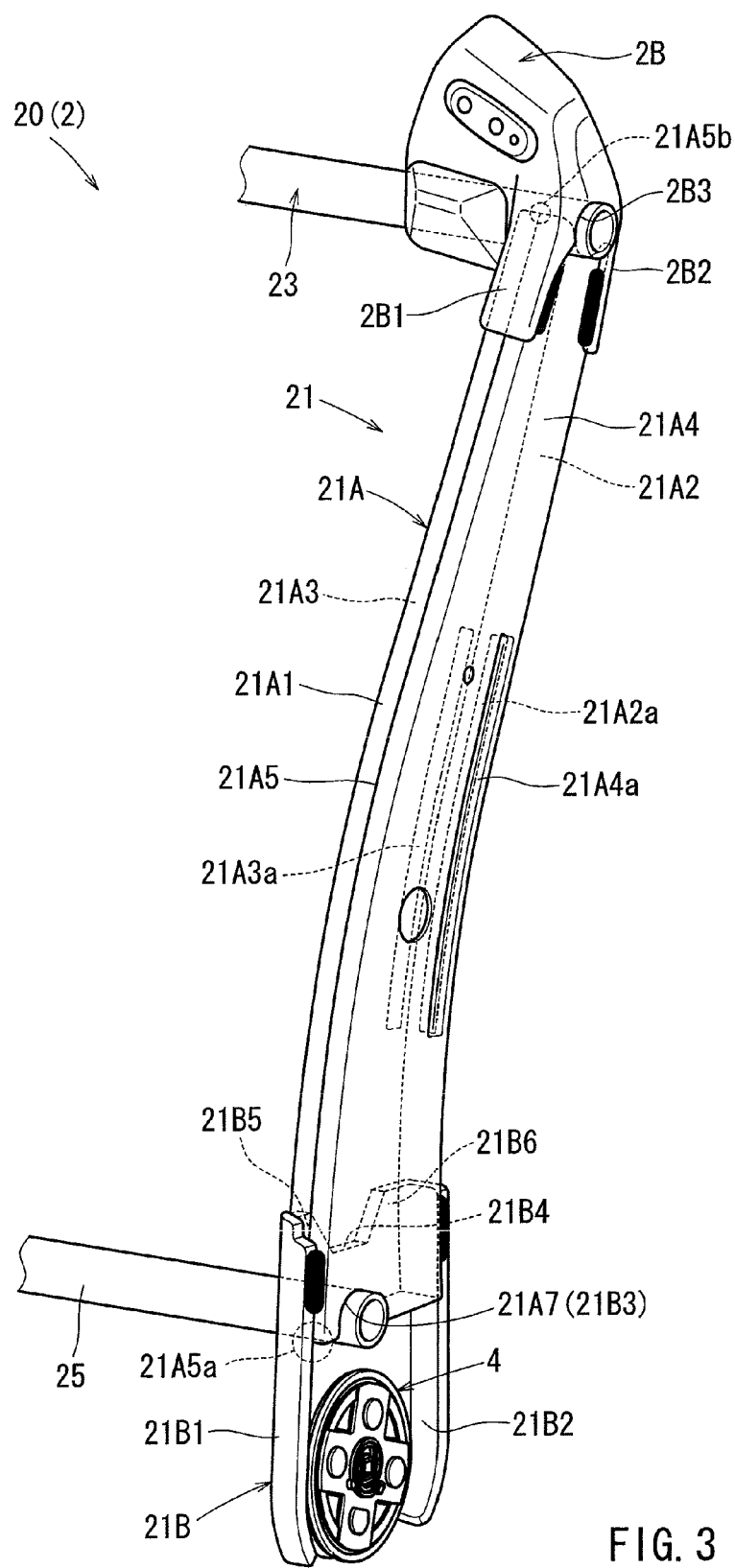
FIG. 3 is the assembled side-frame structure of FIG. 2.

As shown in FIGS. 2 and 3, the belt guide 2B has a passing hole 2B3, a front leg portion 2B1, and a rear leg portion 2B2. The passing hole 2B3 expands upwardly from the lower end of the belt guide 2B. The upper pipe 23 is passed through the passing hole 2B3 in the width direction of the seat. The front leg portion 2B 1 and the rear leg portion 2B2 are respectively brought into contact with a front wall portion 21A1 and a rear wall portion 21A2 of a rectangular tubular frame 21A of the side frame 21. The upper pipe 23 and the right and left side edge portions of the passing hole 2B3, which contact each other, are arc-welded together. The front leg portion 2B1 and the front wall portion 21A1 are arc-welded to each other, and the rear leg portion 2B2 and the rear wall portion 21A2 are arc-welded to each other. As a result, the upper pipe 23 and the side frame 21 are connected to each other firmly and integrally.

Each of the side frames 21 and 22 exhibits an arcuately curved configuration. The upper region of each of the side frames 21 and 22 is situated on the rear of the lower region in the seat. The side frames 21 and 22 have portions supporting the waist of the occupant from both outer sides, and these portions protrude largely forward. As a result, the side frames 21 and 22 can firmly support the body around the waist of the occupant from both outer sides. The rear portions of the side frames 21 and 22 are recessed. This provides a larger space around the knees of an occupant seated in the rear.

In producing the side frame 22 as shown in FIG. 1, a thin steel plate of a thickness of 1.2 mm is cut in an arcuately curved configuration. After this, the edge portions on the front and rear of the side frame 22 (flange portions 22A and 22B) are bent toward the seat inner side. A recliner 4 is connected to the outer surface of the lower region of the side frame 22. The seat cushion 3 has a cushion frame 30 equipped with a side frame 32. The side frame 22 is connected to the inner surface of the side frame 32 through the intermediation of the recliner 4.

As shown in FIGS. 2 and 3, the side frame 21 has the rectangular tubular frame 21A and a thick plate frame 21B. The rectangular tubular frame 21A is formed by bending a thin steel plate having preferably a thickness of 1.2 mm into a rectangular tubular configuration. The thick plate frame 21B is formed of a thick steel plate having preferably a thickness of 4 mm, and is connected to the lower portion of the rectangular tubular frame 21A.

In producing the rectangular tubular frame 21A, a thin steel plate is cut so that the rectangular tubular frame 21A extends vertically. After this, the thin steel plate is bent into a rectangular sectional configuration so that both ends thereof contact each other.

Both ends of the configuration are then integrally bonded together through laser welding, and the rectangular tubular frame 21A is formed having a closed sectional configuration. As a result, the rectangular tubular frame 21A can exhibit high structural strength against bending and torsion.

After this, the rectangular tubular frame 21A is bent backwards into an arcuate configuration through further press work. The steel plate constituting the rectangular tubular frame 21A is a high tensile steel plate exhibiting high structural strength against bending and torsion. A high strength material exhibits rather low ductility. Thus, when the high strength material of a rectangular tubular configuration is bent arcuately, wrinkles, fractures, etc. can be generated at the bent portion.

Figure 7:
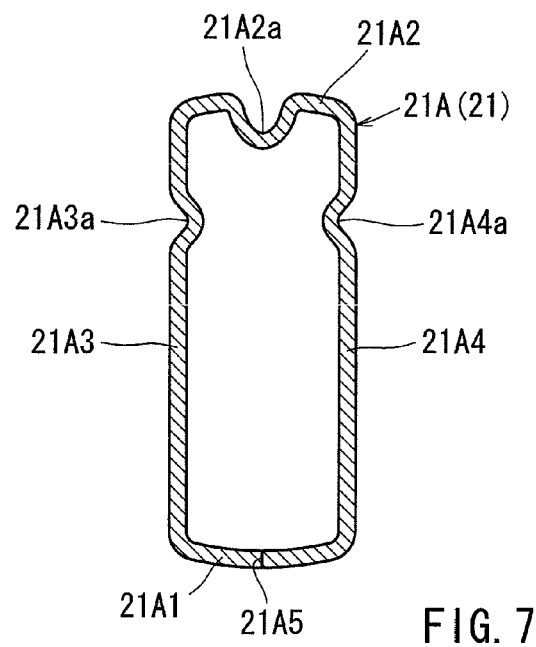
FIG. 7 is a cross-sectional view taken along line VII-VII in FIG. 4.

As shown in FIGS. 2 and 7, recessed lines 21A2a, 21A3a, and 21A4a are respectively formed in an inner side wall portion 21A3, an outer side wall portion 21A4, and a rear wall portion 21A2 prior to the press work. The recessed lines 21A2a, 21A3a, and 21A4a are recessed toward the interior of the tube of the rectangular tubular frame 21A, and extend in a longitudinal direction of the rectangular tubular frame 21A. The rear wall portion 21A2, the inner side wall portion 21A3, and the outer side wall portion 21A4 are compressed by bending the rectangular tubular frame 21A arcuately. The recessed lines 21A2a, 21A3a, and 21A4a can disperse the compressive forces of each wall portion. As a result, the recessed lines 21A2a, 21A3a, and 21A4a can suppress the generation of wrinkles, fractures or the like on surfaces of the wall portions 21A2 to 21A4. As a result, the rectangular tubular frame 21A can be smoothly curved into an arcuate configuration.

As shown in FIG. 2, the rectangular tubular frame 21A has a seam 21A5 between the edge portions. The seam 21A5 extends straight in the height direction along a center line in the width direction of the front wall portion 21A1. The front wall portion 21A1 faces towards the front, and only receives an in-plane stress in the tensile direction when the rectangular tubular frame 21A is bent arcuately. The rear wall portion 21A2, the inner side wall portion 21A3, and the outer side wall portion 21A4, all receive an in-plane stress in the compressing direction. Therefore, they are all difficult to bend. Conversely, the front wall portion 21A1 can be bent relatively smoothly. The recessed lines 21A2a, 21A3a, and 21A4a are only formed in the intermediate regions in the height direction of the arcuate portions of the rear wall portion 21A2, the inner side wall portion 21A3, and the outer side wall portion 21A4. No recessed lines are formed in the upper region and the lower region. Such lines are preferably straight and not arcuate.

As shown in FIGS. 2 and 3, the thick plate frame 21B is a thick steel plate that is thicker and of a higher structural strength than the plate of the rectangular tubular frame 21A. The thick plate frame 21B contacts the lower portion of the rectangular tubular frame 21A and is bonded thereto through welding. More specifically, the upper region of the thick plate frame 21B contacts the lower region of the inner side wall portion 21A3. The upper edge portion of the thick plate frame 21B and the rectangular tubular frame 21A which contact each other are bonded together through arc welding. The lower edge portion of the inner side wall portion 21A3 and the thick plate frame 21B which contact each other are bonded together through arc welding.

The thick plate frame 21B has, at the front and rear edge portions, a front flange portion 21B1 and a rear flange portion 21B2, respectively, formed through bending in the width direction of the seat. The flange portions 21B1 and 21B2 contact the front wall portion 21A1 and the rear wall portion 21A2, respectively, of the rectangular tubular frame 21A. The edge portions of the flange portions 21B1 and 21B2 are bonded to the front wall portion 21A1 and the rear wall portion 21A2, respectively, through arc welding.

As shown in FIGS. 2 and 3, the seam 21A5 is formed at the center in the width direction of the front wall portion 21A1 of the rectangular tubular frame 21A. The front flange portion 21B1 extends beyond the seam 21A5 in the width direction so as to cover the seam 21A5. The tip portion of the flange portion 21B1 is integrally bonded to the front wall portion 21A1 through arc welding. In performing the arc welding, the arc-welded portion is caused to extend upwardly from a position at a preferable distance of 7 mm or more from the lower end portion of the front wall portion 21A1 so that the lower end portion of the front wall portion 21A1 formed of a thin steel plate may not melt under the heat of the welding.

In a state in which the front flange portion 21B1 covers the seam 21A5 of the front wall portion 21A1, the thick plate frame 21B is welded to the front wall portion 21A1. The thick plate frame 21B extends the seam 21A5 and is bonded to the rectangular tubular frame 21A. Thus the thick plate frame 2113 holds the rectangular tubular frame 21A from the inner side of the seam 21A5 while the thick plate frame 21B is bonded to the front wall portion 21A1 at the outer side of the seam 21A5. A lower end portion 21A5a of the seam 21A5 is covered with the front wall portion 21A1 of the thick plate frame 21B. Since the lower end portion 21A5a of the seam 21A5 consists of a thin steel plate, it may melt from the heat during laser welding. In this structure, however, the portion possibly subjected to melting is covered with the thick plate frame 21B. Thus, it is possible to prevent a reduction in the structural strength of the rectangular tubular frame 21A.

As shown in FIGS. 2 and 3, the thick plate frame 21B contacts the inner side wall portion 21A3. The front flange portion 21B1 strides across the seam 21A5, and the tip portion thereof is integrally welded to the thick plate frame 21B. The rear flange portion 21B2 is integrally welded to the rear wall portion 21A2. As a result, the thick plate frame 21B strongly constrains the rectangular tubular frame 21A so as to prevent the rectangular tubular frame 21A from undergoing deformation in the direction in which the seam 21A5 could be torn apart (the width direction). Loads in various directions input to the side frame 21 pass the rectangular tubular frame 21A and the thick plate frame 21B. These loads are appropriately transmitted via the region of high structural strength without passing the melted-down lower end portion 21A5a of the seam 21A5.

The belt guide 2B is connected to the upper end portion of the rectangular tubular frame 21A. The belt guide 2B is mounted to the rectangular tubular frame 21A so as to extend on both sides of the seam 21A5 in the width direction. The belt guide 2B has the front flange portion 21B1. The front flange portion 21B1 is integrally connected to the rectangular tubular frame 21A on both sides of the seam 21A5. The front leg portion 2B1 of the belt guide 2B contacts the front wall portion 21A1 of the rectangular tubular frame 21A. The front leg portion 2B1 has portions extending from right and left edge portions toward the seat rear side. The portions contact the inner side wall portion 21A3 and the outer side wall portion 21A5b, and are integrally connected to the rectangular tubular frame 21A by arc welding. As a result, in the rectangular tubular frame 21A, an upper end portion 21A5b of the seam 21A5 is covered by the front leg portion 2B1 of the belt guide 2B. Since the upper end portion 21A5b of the seam 21A5 is formed of a thin steel plate, it may be melted down at the time of laser welding. The front leg portion 2B1 covers the portion that may be melted down. Thus, it is possible to prevent a reduction in the structural strength of the rectangular tubular frame 21A.

The front leg portion 2B 1 of the belt guide 2B contacts the front wall portion 21A1. The belt guide 2B strongly constrains the rectangular tubular frame 21A so as to prevent the rectangular tubular frame 21A from undergoing deformation in the direction in which the seam 21A5 may be torn apart (the width direction). Loads in various directions may be input to the upper pipe 23 and the side frame 21. The loads pass the rectangular tubular frame 21A and the belt guide 2B. The loads are appropriately transmitted via the region of high structural strength without passing the upper end portion 21A5b of the seam 21A5. This upper end portion 21A5b of the seam 21A5 may be subject to melting.

The recliner 4 is connected to the outer side surface of the thick plate frame 21B. The recliner 4 is connected to the inner side surface of the side frame 31 of the cushion frame 30. The recliner 4 is connected to the thick plate frame 21B, so that, as compared with the construction in which the recliner 4 is connected to the thin steel plate, it is possible to provide a higher connection strength. When a large load is input to the seatback 2, the lower end side region of the side frame 21 receives the largest bending load. It is possible to effectively enhance the structural strength of the lower end side region of the side frame 21 due to the thick plate frame 21B.

As shown in FIG. 2, the thick plate frame 21B has a surface that contacts the inner side wall portion 21A3. A recess (cutout portion) 21B4 is formed at the center of the upper edge portion of the surface. The recess 21B4 is cut downwardly in a recessed configuration. The recess 21B4 helps to reduce the change in section modulus generated in the boundary region between the connection portion and the non-connecting portion.

They differ in that the connecting portion connects with the rectangular tubular frame 21A and the thick plate frame 21B while the non-connecting portion does not connect with them. The recess 21B4 has step side surfaces extending toward the bottom surface thereof. The side surfaces are inclined surfaces inclined at an angle larger than a right angle. The inclined configuration of the recess 21B4 helps to further reduce the change in section modulus generated in the above-mentioned boundary region.

The lower region of the side frame 21 is particularly subject to the load of a bending moment. The requisite structural strength of the lower region is secured by the thick plate frame 21B. There is involved an abrupt change in section modulus between the connection portion, which connects the rectangular tubular frame 21A and the thick plate frame 21B, and the non-connecting portion. Due to the above-described structure, however, it is possible to broadly receive the input load by the structure as a whole without involving any local stress concentration. Thus, the vehicle-outer-side side frame 21 exhibits high structural strength. When the side portion of the vehicle suffers collision, the vehicle-outer-side side frame 21 may receive a large load from the vehicle outer side. In this case, the side frame 21 can broadly receive the load with the entire structure without involving any local stress concentration. As a result, it is possible to increase the period of time that elapses until the side frame 21 is bent in a buckled fashion. That is, in the present structure, the lightweight rectangular tubular frame 21A formed of a thin steel plate and the high-strength thick plate frame 21B formed of a thick steel plate are appropriately combined with each other. As a result, it is possible, in the present structure, to attain compatibility between a reduction in weight and the securing of the requisite strength.

The recess 21B4 is formed at the center of the upper edge portion of the thick plate frame 21B. On both sides of the recess 21B4, there is provided a front portion 21B5 and a rear portion 21B6. As a result, when a large load in the longitudinal direction is input to the seatback 2, it is possible to support the lower end portion of the rectangular tubular frame 21A from below with a strong force by the front portion 21B5 and the rear portion 21B6 of the thick plate frame 21B.

The rectangular tubular frame 21A is of a closed sectional configuration and exhibits high structural strength. The rectangular tubular frame 21A and the recliner 4 contact and are connected to the same surface (outer side surface) of the thick plate frame 21B. The rectangular tubular frame 21A and the recliner 4 are arranged at the same position in the width direction. As a result, the installation space in the width direction in which the three members are arranged is reduced. An armrest support bracket 26 for attaching an armrest device (not shown) is integrally connected to the outer side wall portion 21A4 of the rectangular tubular frame 21A (See FIGS. 1, 4, and 5). Since the rectangular tubular frame 21A is of a closed sectional configuration, the strength with which the armrest support bracket 26 is supported is high.

As shown in FIGS. 1 and 4, in addition to the upper pipe 23, two reinforcing pipes 24 and 25 are provided between the side frames 21 and 22. The reinforcing pipes 24 and 25 are formed by bending round steel tubes in a crankshaft-like fashion. The reinforcing pipe 24 bridges between the intermediate portions of the side frames 21 and 22. The reinforcing pipe 25 bridges between the lower portions in the height direction of the side frames 21 and 22. The reinforcing pipe 24 has a flattened plate-like vehicle-inner-side end portion. The end portion contacts the bent flange portion 22B on the rear edge of the side frame 22 from the seat rear, and is integrally connected therewith. The vehicle-outer-side end portion of the reinforcing pipe 24 is passed through the inner side wall portion 21A3 and the outer side wall portion 21A4 of the rectangular tubular frame 21A constituting the side frame 21. The portions connected together by passing through are firmly integrated with each other through welding.

The reinforcing pipe 25 has a vehicle-inner-side end portion to be passed through the side frame 22. The portion passed through is firmly integrated with the side frame 22 by welding. The vehicle-outer-side end portion of the reinforcing pipe 25 is passed through the connecting portion of the rectangular tubular frame 21A and the thick plate frame 21B constituting the side frame 21. The portions connected together by passing through are firmly integrated with each other through welding (See FIG. 6). The vehicle-outer-side end portion of the reinforcing pipe 25 is passed through a round hole 21B3 formed in the thick plate frame 21B and a semicircular hole 21A7 formed at the lower end portion of the rectangular tubular frame 21A. The portions connected together by passing through are firmly integrated with each other through welding. The reinforcing pipes 24 and 25 are mounted to the back frame 20 in a ladder-like fashion so as to enhance the structural strength of the back frame 20 against bending or torsion.

The frame structure has two frames (the rectangular tubular frame 21A and the thick plate frame 21B) extending in a specific direction (the seat height direction). The two frames contact each other in a direction (the width direction of the seat) perpendicular to said specific direction and are bonded together. There is a pile portion where the two frames contact each other and are piled together. There is formed, at an edge region in said specific direction of the piled portion (the upper edge portion of the thick plate frame 21B), a section modulus reducing configuration (the recess 21B4). The section modulus reducing configuration may help to achieve a reduction in section modulus.

Thus, the change in section modulus generated between the piled portion and the region off the piled portion is reduced. The frame structure has a simple construction in which the two frames contact each other in a direction perpendicular to the specific direction in which they extend. The construction does not involve a reduction in structural strength causing an abrupt change in section modulus. It is possible to attain compatibility between a reduction in weight accompanying a reduction in section modulus and the securing of the requisite strength. Thus, it is possible to form a frame structure that can be easily produced.

The two frames connected to each other (the rectangular tubular frame 21A and the thick plate frame 21B) include a high strength frame exhibiting higher mechanical strength (the thick plate frame 21B) and a low strength frame exhibiting lower mechanical strength (the rectangular tubular frame 21A). The high strength frame has a section modulus reducing configuration (the recess 21B4) at an edge portion thereof. The section modulus reducing configuration may effectively reduce a predefined position. The predefined position may be an edge portion of a pile portion piling the two frames. The lower strength frame extends from the edge portion.

Figure 8:
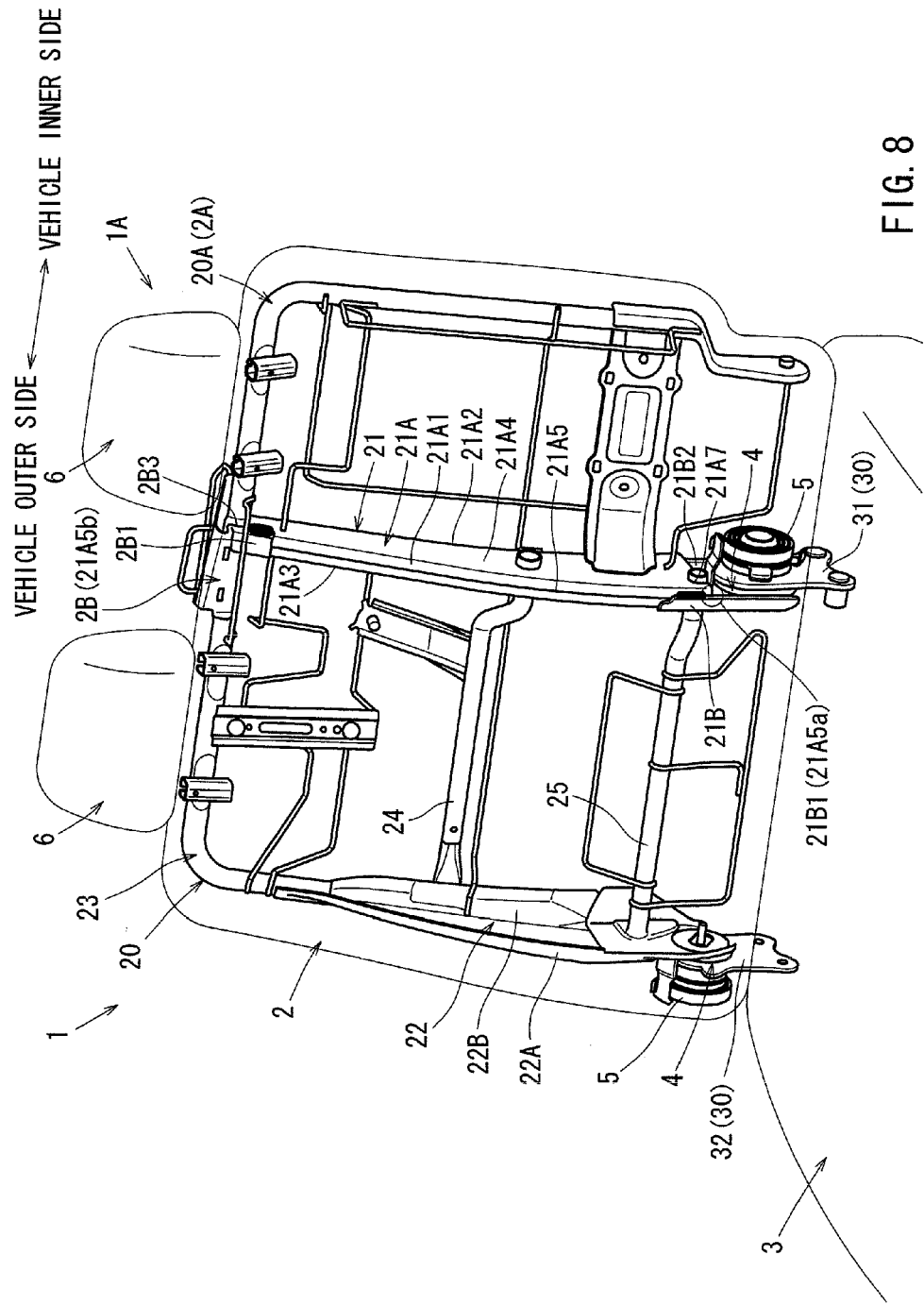
FIG. 8 is a perspective view of a frame structure of a vehicle seat according to another configuration.
Figure 9:
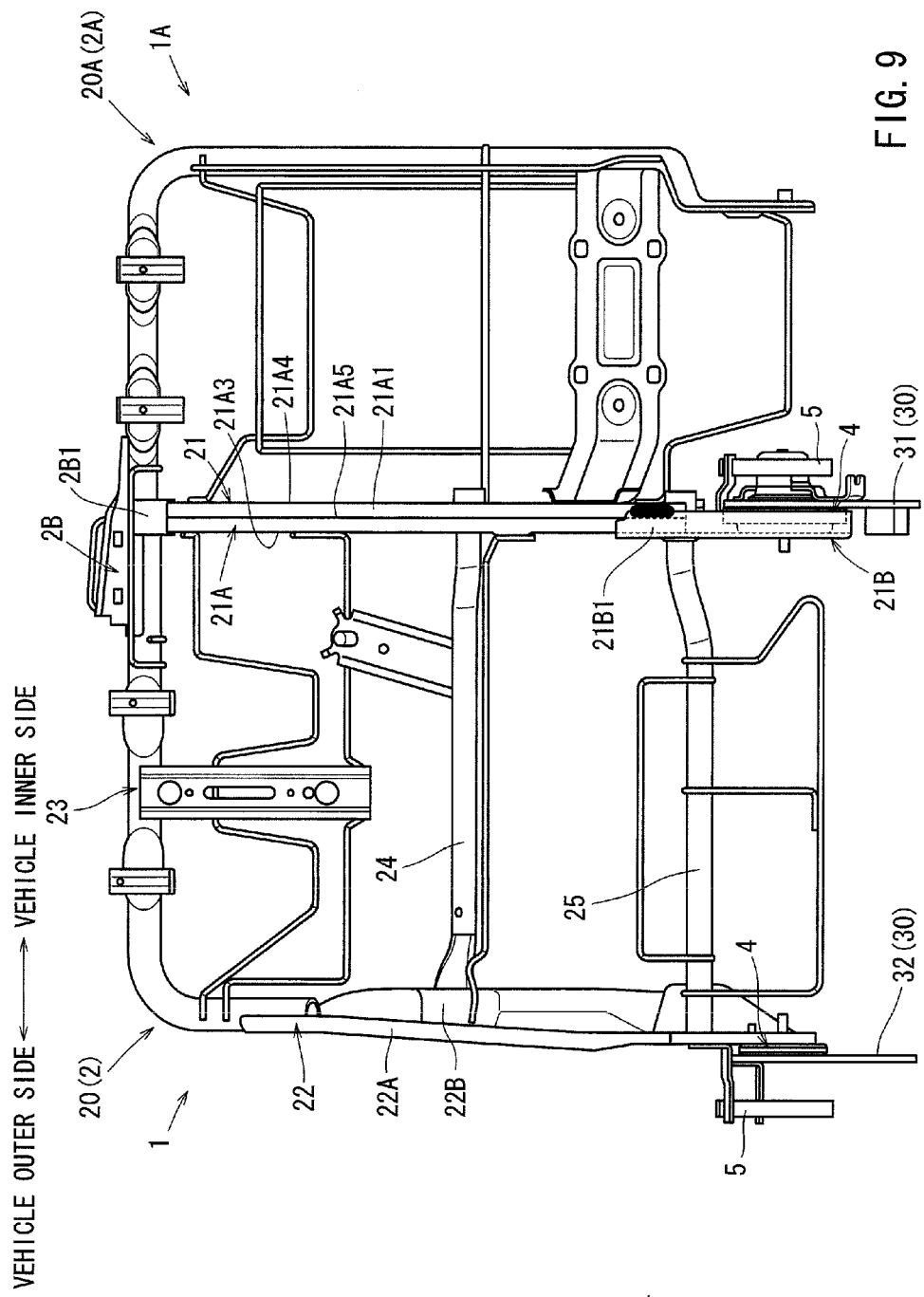
FIG. 9 is a front view of the frame structure of the vehicle seat of FIG. 8.

Instead of the structure of FIGS. 1 to 7, the seat 1 may have a structure as shown in FIGS. 8 and 9. The seat 1 may have the same members as those of the members of FIGS. 1 to 7. The same members are indicated by the same reference numerals. A description of the same members will be left out. A vehicle may have a rear seat for three persons in the rearmost row. The rear seat may be divided in a proportion of 6:4. A larger one of the divisional seat may be the seat 1. The seat 1 may be a seat for two persons. The seat 1 integrally has, at the vehicle-inner-side side portion thereof, the construction of a central seat 1A having a small lateral width.

The seat 1 has the reverse U-shaped back frame 20. The back frame 20 has the vehicle-inner-side side frame 21. A back frame 20A constituting the inner framework of a seatback 2A of the central seat 1A is integrally connected to the side frame 21. The back frame 20A is supported by the side frame 21 in a cantilever-like fashion. Thus, the side frame 21 is preferably strong enough to support the back frame 20A. The construction of the side frame 21 is substantially the same as that of the side frame 21 described above.

Figure 10:
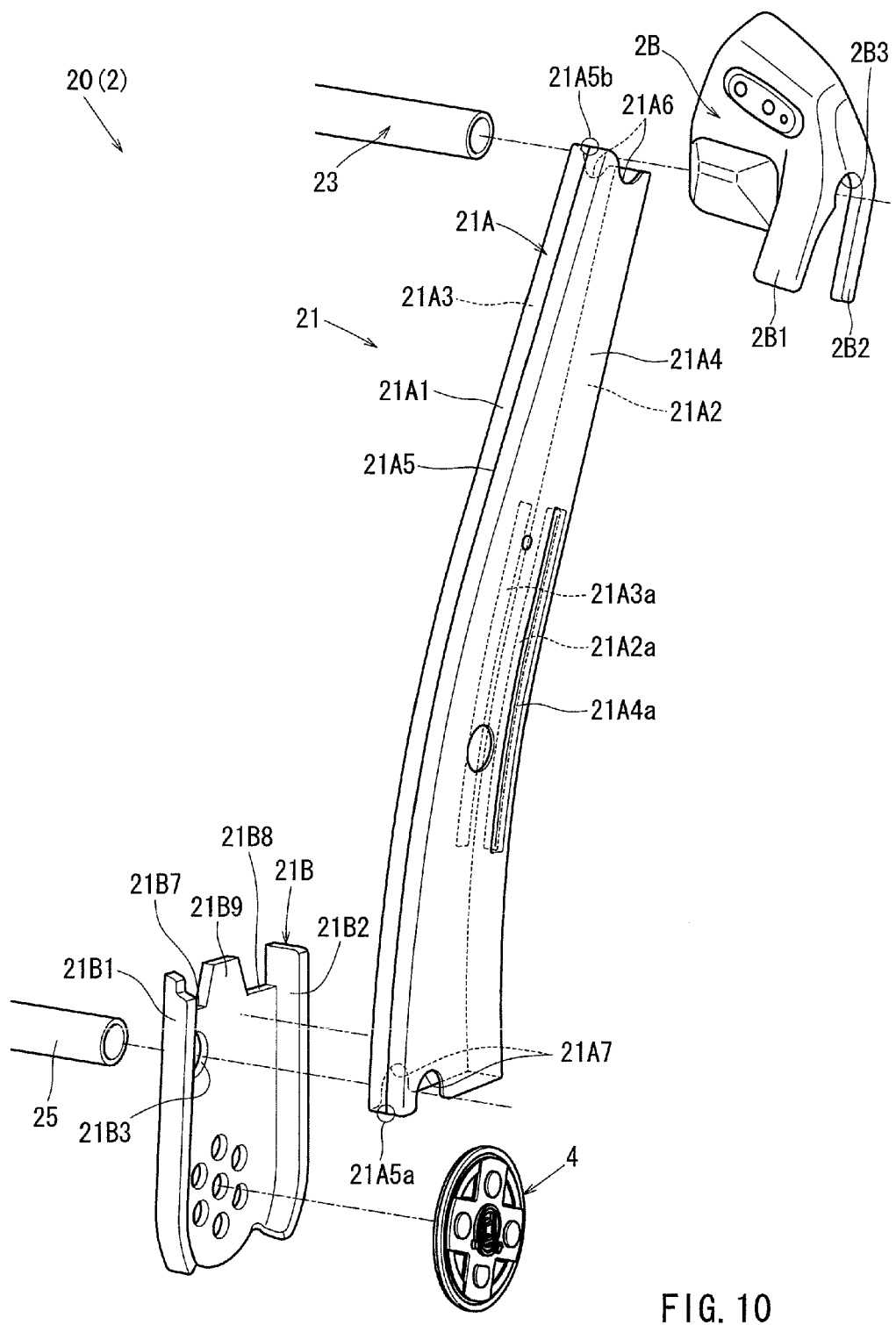
FIG. 10 is an exploded view of a main portion of a frame structure of a vehicle seat according to another configuration.

Instead of the structure of FIGS. 1 to 7, the seat 1 may have a structure as shown in FIG. 10. As shown in FIG. 10, a thick plate frame 21B has a surface contacting a rectangular tubular frame 21A. Two front and rear recesses (a front recess 21B7 and a rear recess 21B8) are formed at an upper edge of the surface. The recesses (cutouts) have a downwardly cut-out configuration. The recesses help to reduce the change in section modulus generated in the boundary region between the rectangular tubular frame 21A and the portion to which the thick plate frame 21B is connected. Between the recesses, there is formed a central portion 21B9. The central portion 21B9 has step side surfaces extending toward the bottom surfaces of the recesses. The side surfaces are inclined surfaces of an angle larger than the right angle. The inclined configuration of the recesses help to further reduce the change in section modulus generated in the above-mentioned boundary region.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

The frame structure for a vehicle seat is applicable to any of automotive seats including a driver's seat, a passenger seat next to the driver's seat, and rear seats. The frame structure is applicable to vehicle seats other than those found in automobiles such as those found on a train, railroad car, etc. The frame structure is applicable to a seat for various vehicles such as an aircraft and a ship.

As described above, the frame structure is applicable to the seatback of a vehicle seat. Alternatively, the frame structure is applicable to other seat components such as a seat cushion and a headrest. The frame structure is applicable to various reinforcing structures with which a vehicle seat is provided, such as a slide rail, an ottoman, and a seat lifter. The present frame structure is applicable to a frame structure in which two frames extending in a specific direction are integrally connected to each other.

As described above, the specific direction in which the two frames extend may be the seat height direction. Alternatively, the specific direction may be any other direction such as the seat longitudinal direction or the width direction. The two frames extend in the same direction (specific direction) and have a portion contacting each other in a direction perpendicular to the specific direction. One or both of the frames may be bent halfway and extend in a direction different from the specific direction.

As described above, the two frames may be connected to each other by arc welding. Alternatively, the two frames may be connected to each other by laser welding, or some other fastening method. As described above, the direction in which the two frames abut each other may be a direction perpendicular to the specific direction in which the two frames extend. One of the two frames may be connected to an intermediate portion of the other. That is, one may extend in the specific direction longer than the other, and may contact with and connect to the intermediate portion of the other. In this case, it is desirable to form a section modulus reducing configuration at both edge portions of the pile portion where the two frames contact and connect with each other.

As described above, the two frames (the rectangular tubular frame 21A and the thick plate frame 21B) preferably differ from each other in mechanical strength. The section modulus reducing configuration is formed at the edge portion of the high strength frame. The high strength frame exhibits higher mechanical strength. The edge portion may be the upper edge portion of the thick plate frame 21B. Alternatively, the two frames may have the same level of mechanical strength. In such a construction, the section modulus reducing configuration may be formed at an edge portion at either one or both of the frames. Alternatively, the section modulus reducing configuration may be formed at the edge portion of the frame of lower mechanical strength. The section modulus reducing configuration may be formed by partially thinning the edge portion of one frame. Alternatively, the section modulus reducing configuration may have a portion bent so as to achieve a reduction in section modulus. Finally, the section modulus reducing configuration may have a hole, groove or wave shape which has a plurality of bent portions.

What is claimed is:

1. A vehicle seat comprising:
   a first frame and a second frame both extending in a seat height direction, the first frame being a tubular frame that includes a front wall portion with a forward curvature, a rear wall portion with a forward curvature, and side wall portions connecting respectively the front wall portion and the rear wall portion;
   a reinforcing pipe;
   a pile portion where the first frame and the second frame abut each other in a seat width direction, which is perpendicular to the seat height direction, and the first frame and the second frame are connected to each other; and
   a section modulus reducing configuration defined at an edge portion of the pile portion and arranged in the seat height direction, wherein
   the section modulus reducing configuration is configured to achieve a reduction in section modulus,
   the second frame has a hole through which the reinforcing pipe passes,
   the first frame has one of a hole and a groove through which the reinforcing pipe passes,
   the second frame is interposed in a longitudinal direction of the reinforcing pipe between the first frame and a center of the vehicle seat,
   the section modulus reducing configuration is provided between the first frame and the center of the vehicle seat,
   the rear wall portion is defined with a recess line that is recessed toward an interior of the first frame and extends in a longitudinal direction of the first frame and at least one of the side wall portions of the first frame is defined with a recess line that is recessed toward the interior of the first frame and extends in the longitudinal direction of the first frame, and
   the recess lines extend along an intermediate region of the first frame and terminate at the intermediate region such that the recess lines are spaced from the second frame and do not extend along an upper region and a lower region of the first frame.

2. The vehicle seat of claim 1, wherein
   the second frame has a higher mechanical strength than the first frame, and
   the section modulus reducing configuration is defined at an edge portion of the second frame.

3. The vehicle seat of claim 1, wherein
   the section modulus reducing configuration is a cutout portion defined at an edge portion of at least one of the first frame and the second frame.

4. The vehicle seat of claim 1, wherein
   the tubular first frame includes a seam between edge portions of the first frame, and
   the seam extends in the longitudinal direction of the first frame.

5. The vehicle seat of claim 4, wherein
   he second frame has a flange portion welded to the tubular frame so as to cover the seam of the tubular frame.

6. The vehicle seat of claim 1, wherein
   the second frame has an inner surface facing toward the center of the vehicle seat and an outer surface located opposite to the inner surface,
   the first frame is connected to a first portion of the outer surface of the second frame,
   a recliner is connected to a second portion of the outer surface of the second frame, and
   the first portion and the second portion are arranged in the seat height direction.

\* \* \* \* \*